(12) United States Patent
Yeoman et al.

(10) Patent No.: US 7,712,559 B2
(45) Date of Patent: May 11, 2010

(54) FRONT-WHEEL DRIVE STEERING COMPENSATION METHOD AND SYSTEM

(75) Inventors: John Andrew Yeoman, Dunlap, IL (US); Michael Dan Strnad, Metamora, IL (US); Kevin Lynn Claytor, Mt. Zion, IL (US); Stephen Victor Lunzman, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 45 days.

(21) Appl. No.: 11/987,932

(22) Filed: Dec. 6, 2007

(65) Prior Publication Data

US 2008/0091325 A1 Apr. 17, 2008

Related U.S. Application Data

(63) Continuation of application No. 10/928,167, filed on Aug. 30, 2004, now Pat. No. 7,325,636.

(51) Int. Cl.
*B60K 7/00* (2006.01)
*B60K 17/30* (2006.01)

(52) U.S. Cl. .................. 180/62; 180/6.24; 180/6.26; 180/6.3; 180/6.48; 180/419

(58) Field of Classification Search .................. None
See application file for complete search history.

(56) References Cited

U.S. PATENT DOCUMENTS

| | | | |
|---|---|---|---|
| 4,183,419 A | 1/1980 | Henn et al. | |
| 4,553,620 A | 11/1985 | Eckhardt et al. | |
| 4,798,259 A | 1/1989 | Azuma et al. | |
| 4,914,592 A | 4/1990 | Callahan et al. | |
| 5,147,010 A | 9/1992 | Olson et al. | |
| 5,172,787 A | 12/1992 | Kobayashi | |
| 5,258,912 A | 11/1993 | Ghoneim et al. | |
| 6,109,384 A | 8/2000 | Bromley et al. | |
| 6,112,842 A | 9/2000 | Ura et al. | |
| 6,135,231 A * | 10/2000 | Reed ...................... | 180/308 |
| 6,152,237 A | 11/2000 | Hartman et al. | |
| 6,508,328 B1 | 1/2003 | Kenyon et al. | |
| 6,631,320 B1 | 10/2003 | Holt et al. | |
| 6,644,429 B2 | 11/2003 | Evans et al. | |
| 6,988,570 B2 | 1/2006 | Takeuchi | |
| 2002/0027025 A1 | 3/2002 | Kobayashi et al. | |
| 2005/0064993 A1 | 3/2005 | Ginther et al. | |

OTHER PUBLICATIONS

Gallery of Motor Graders, Construction Equipment, Aug. 2004, p. 42.

* cited by examiner

*Primary Examiner*—Lesley Morris
*Assistant Examiner*—Marlon A Arce
(74) *Attorney, Agent, or Firm*—Liell & McNeil

(57) ABSTRACT

A method of controlling the speed of a right front wheel and a left front wheel on a work machine includes receiving a speed command based at least partially on an operator input and monitoring at least one wheel steering angle of at least one front wheel. A first front wheel speed command may be determined based at least partially on the at least one wheel steering angle. In addition, a second front wheel speed command may be determined based at least partially on the at least one wheel steering angle. The first front wheel speed command and the second front wheel speed command may be output to independently control the speed of the right and the left front wheels.

20 Claims, 3 Drawing Sheets

FRONT-WHEEL DRIVE STEERING COMPENSATION METHOD AND SYSTEM

This application is a continuation of application Ser. No. 10/928,167, filed on Aug. 30, 2004 now U.S. Pat. No. 7,325,636, the content of which is incorporated herein by reference in its entirety.

TECHNICAL FIELD

This disclosure is directed to a steering compensation method and, more particularly, to a front-wheel drive steering compensation method for a work machine, such as a motor grader.

BACKGROUND

Typical motor graders have all-wheel drive capability with one or more front motors for driving the front wheels and a separate rear transmission for driving the rear wheels. The transmission and the clutch for the front motors typically include a free-wheel capability, meaning that the front wheels are allowed to rotate at a speed faster than they are being driven by the front motors. Therefore, when the rear motor drives faster than the front motors, the front wheels roll freely and will not drag. This is important because the front wheels provide steering capability to the motor grader, and if the front wheels drag, the motor grader's ability to turn is limited.

Although the front and rear wheels typically rotate at the same speed during straight ahead travel, when turning, one or both of the front wheels are required to rotate faster than the rear wheels. In fact, a full turning motor grader may have front wheel speeds that are up to 50% faster than the rear wheel speeds. When this occurs, the front wheels may rotate faster than the driving front motors, thereby causing free-wheeling. Whenever the front wheels are free-wheeling, they are not providing traction into the turn, which can reduce the steerability of the motor grader, and increase the turning radius. Motor graders having a tandem arrangement of rear wheel sets resist turning more than those with a single rear wheel set. Accordingly, the problems associated with free-wheeling on a motor grader with tandem rear wheel sets may be even greater.

One system for driving front wheels on a motor grader is disclosed in U.S. Patent Application Publication No. US 2002/0027025 (the '025 publication) to Kobayashi et al. The '025 publication discloses a system for rotating the front wheels faster than the rear wheels based on the turning radius and the revolution number of the rear wheels. The system measures a front wheel steering angle and an articulation angle, and controls the speed of the front wheels based on the measured factors. However, the '025 publication discloses that a single pump drives both front wheels. Further, the '025 publication discloses an open loop system that cannot compensate one wheel independent of the other to increase traction in a turn. Such a system may result in a loss of traction from at least one front wheel during a turn.

This disclosure is directed to a system and method for independently controlling the front wheel speeds of a work machine by independently adjusting the desired front wheel speeds based on a steering angle or a combination of steering and articulation angles, for example.

SUMMARY OF THE INVENTION

One aspect of the present disclosure is directed to a method of controlling the speed of a right wheel and a left wheel on a work machine. The method includes receiving a speed command based at least partially on an operator input and monitoring at least one wheel steering angle of at least one wheel. A first wheel speed command may be determined based at least partially on the at least one wheel steering angle. In addition, a second wheel speed command may be determined based at least partially on the at least one wheel steering angle. The first wheel speed command and the second wheel speed command may be output to independently control the speed of the right and the left wheels.

In another aspect, the present disclosure is directed to a system for controlling the speed of a right wheel and a left wheel on a work machine. The system includes an operator input device and a speed module configured to generate a speed command based at least partially on a signal from the input device. At least one wheel angle sensor is associated with at least one of the right and the left wheels. The wheel angle sensor may be configured to monitor at least one wheel steering angle of at least one of the right and left wheels. A steering compensation module may be configured to determine a first wheel speed command based at least partially on the at least one wheel steering angle and to determine a second wheel speed command based at least partially on the at least one wheel steering angle. The steering compensation module may be configured to output the first wheel speed command and the second wheel speed command to independently control the speed of the right and the left wheels.

DETAILED DESCRIPTION

Reference will now be made in detail to exemplary embodiments that are illustrated in the accompanying drawings. Wherever possible, the same reference numbers will be used throughout the drawings to refer to the same or like parts.

Figure 1:
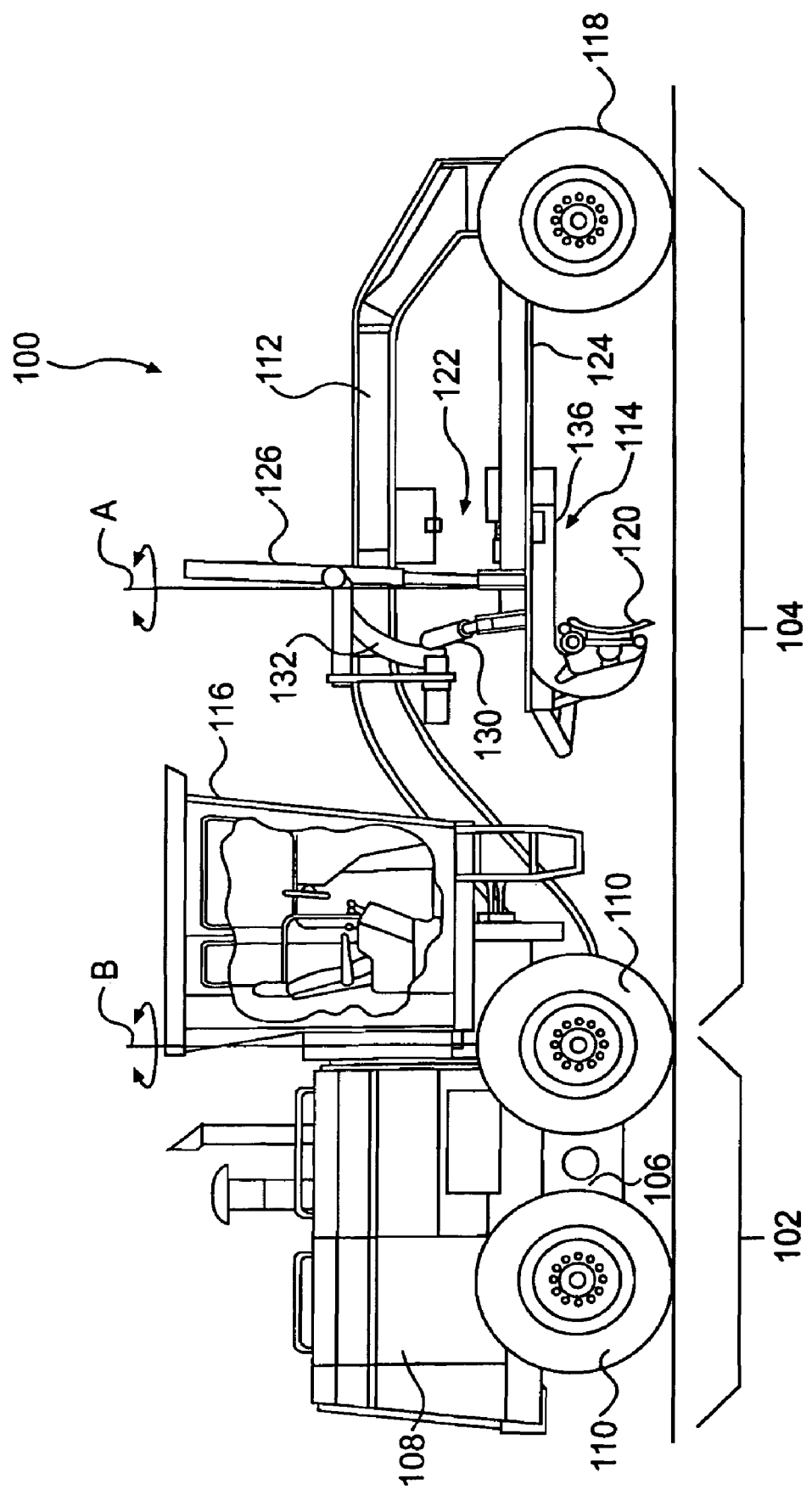
FIG. 1 is a pictorial representation of a side view of an exemplary motor grader.
Figure 2:
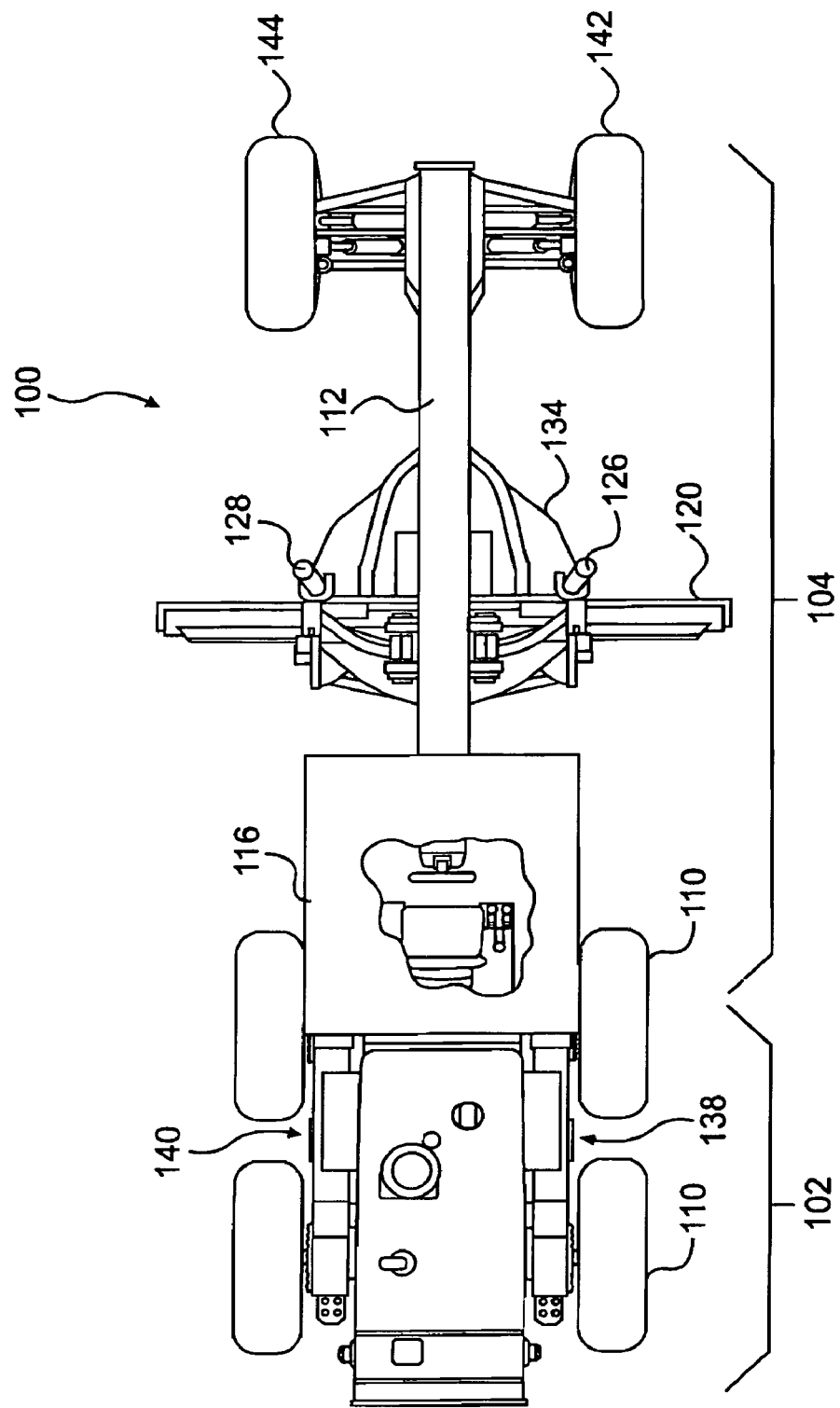
FIG. 2 is a pictorial representation of a top view of the exemplary motor grader of FIG. 1.

An exemplary embodiment of a motor grader 100 is illustrated in FIGS. 1 and 2. The motor grader 100 includes a rear frame section 102 and a front frame section 104. The rear frame section 102 includes a rear frame 106 and an engine in an engine compartment 108. The engine in the engine compartment 108 is mounted on the rear frame 106 and drives or powers rear wheels 110 on the motor grader 100.

The front frame section 104 includes a front frame 112, a blade assembly 114, and an operator cab 116. The front frame 112 extends from front wheels 118 toward the rear wheels 110, and supports the operator cab 116. The operator cab 116 contains the many controls necessary to operate the motor grader 100.

The blade assembly 114 includes a blade 120 and a linkage assembly 122 that allows the blade 120 to be moved to a variety of different positions relative to the motor grader 100. The linkage assembly 122 includes a drawbar 124, a right lift cylinder 126, a left lift cylinder 128 (FIG. 2), a center shift cylinder 130, and a coupling 132.

The drawbar 124 is mounted to the front frame 112, and its position is controlled by the right lift cylinder 126, the left lift cylinder 128, and the center shift cylinder 130. The coupling 132 connects the three cylinders 126, 128, and 130 to the front frame 112. The coupling 132 can be moved during blade repositioning, but is fixed stationary during earthmoving operations. The height of the blade 120 is controlled primarily with the right and left lift cylinders 126, 128. The right and left lift cylinders 126, 128 may be controlled independently and, thus, may be used to angle the blade 120 relative to the ground. The center shift cylinder 130 is used primarily to sideshift the drawbar 124 and all the components mounted to the end of the drawbar 124, relative to the front frame 112.

The drawbar 124 includes a large, flat plate, commonly referred to as a yoke plate 134, shown in FIG. 2. Beneath the yoke plate 134 is a large gear or circle 136 (FIG. 1). The circle 136 may be rotated using methods known in the art to pivot the blade 120 about a blade axis A to establish a blade cutting angle.

As best seen in FIG. 2, a right articulation cylinder 138 and a left articulation cylinder 140 are respectively mounted to the right and left side of the rear frame 106. The right and left articulation cylinders 138, 140 are used to rotate the rear frame section 102 relative to the front frame section 104 about an articulation axis B shown in FIG. 1. The angle of the rear frame 106 relative to the front frame 112 is referred to herein as an articulation angle. In FIG. 2, the motor grader 100 is positioned at a zero articulation angle.

FIG. 2 also shows that the front wheels 118 include a right front wheel 142 and a left front wheel 144. The front wheels 118 are configured to turn relative to the front frame 112 to steer the motor grader 100 using known methods. The angle formed between the direction of the front wheels 118 and the front frame 112 is referred to herein as a wheel steering angle. For example, when the wheels are facing directly forward, and the work machine is not articulated, the wheel steering angle is zero. Any pivoting of the wheels 118 relative to the front frame 112 increases the wheel steering angle by the amount that the front wheels 118 are pivoted.

Figure 3:
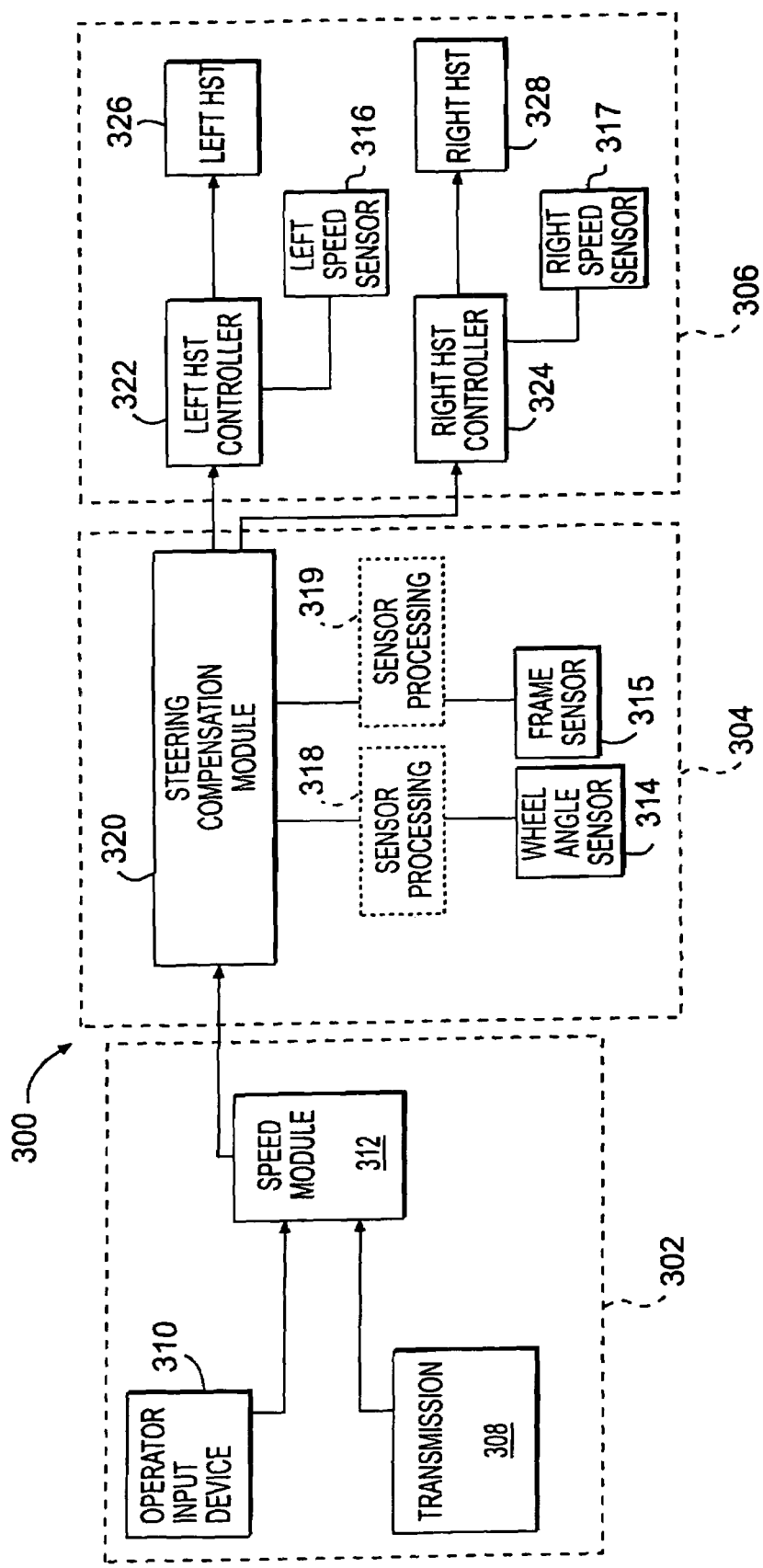
FIG. 3 is a block diagram of a control system for controlling the speed of the front wheels of a motor grader to provide traction during a turn.

FIG. 3 shows a control system 300 for controlling the speed of the front wheels 118 of the motor grader 100 to ensure front wheel traction during a turn. The control system 300 includes a speed control 302, a steering compensation control 304, and a wheel driving system 306. The control system 300 is configured to generate a desired speed ratio and then generate an adjusted speed ratio, based on the desired speed ratio and the steering angle and/or articulation angle. The desired speed ratio is a ratio that is equal to the rear transmission speed ratio multiplied by an aggression factor controlled by an operator. The rear transmission speed ratio is a ratio between the transmission output speed and the transmission input speed. The aggression factor is adjustable factor that controls the desired speed of both front wheels relative to the rear wheel speed. The adjusted speed ratio is a ratio calculated to increase or decrease the front wheel speeds to provide traction during a turn.

The speed control 302 is configured to determine a desired speed ratio by multiplying the rear transmission speed ratio by the aggression factor as controlled by an operator. Thus, the operator may control the front wheels to operate at a faster or slower speed than the rear wheels. The speed control 302 includes a transmission 308, one or more operator input device(s) 310, and a speed module 312. The transmission 308 may be any standard transmission and may be associated with the speed module 312 in a manner to send signals to the speed module 312 representative of a transmission speed ratio from the transmission 308. The transmission speed ratio may be derived from a calculation of the transmission speed output divided by the motor speed input. Accordingly, the transmission speed ratio may differ from gear to gear.

The operator input device 310 may be any standard analog or digital input device including a dial, a joystick, a keyboard, a pedal, and/or other input device known in the art, used alone or in combination. In one exemplary embodiment, the operator input device 310 is associated with the speed module 312 to control the front wheel speed relative to the rear wheel speed by adjusting the aggression factor. For example, the operator input device 310 may be configured adjust the aggression factor to allow an operator to control the front wheel speed relative to the rear wheel speed within an allowable range. In one exemplary embodiment, the allowable range allows the operator to select a front wheel speed that is between 90% and 120% of the rear wheel speed. Accordingly, in operation, an operator may use the input device 310 adjust the aggression factor to set the front wheel speed at a percentage of the rear wheel speed, such as, for example, 110%. In this exemplary embodiment, the front wheel speed would therefore be 10% higher than the rear wheel speed.

The speed module 312 is associated with transmission 308 and the operator input device 310, and may be any module capable of performing a calculation and determining the desired speed ratio based on the transmission speed ratio from the transmission 308 and the adjustment factor from the operator input device 310. In addition, the speed module 312 may consider the current operating gear of the transmission 308 when determining the desired speed ratio.

The steering compensation control 304 is configured to adjust the desired speed ratio and output an adjusted speed ratio to control each front wheel to provide sufficient traction at all times during a turn. The steering compensation control 304 may include a wheel angle sensor 314, a frame sensor 315, an optional sensor processing 318, an optional sensor processing 319, and a steering compensation module 320.

The wheel angle sensor 314 may be one or more sensors associated with one or both of the right and left front wheels 142, 144 and may be configured to monitor the right and/or left front wheels 142, 144 to determine a wheel steering angle based on signals from the wheel angle sensor 314. As explained above, the wheel steering angle is the turning angle of the wheel, relative to the front frame 112, and may be controlled using any standard steering system on the motor grader, such as a steering wheel in the operator cab 116. In one exemplary embodiment, the wheel angle sensor 314 is configured to monitor the wheel steering angle by monitoring the angles of steering linkages at the front wheels 118. In another exemplary embodiment, the wheel angle sensor 314 is configured to monitor the wheel steering angle by measuring the extension amount of an actuator, such as a hydraulic actuator, that controls the steering of the front wheels 118. The wheel angle sensor 314 may be located at any number of different positions where it can monitor the amount of turn of a front wheel, and may be a system to sense movement of the controls, such as movement of the steering wheel in the operators cab 116, movement of a steering joystick, or at other locations. It should be noted that the wheel angle sensor 314 may be any system configured to determine the steering angle, and may include one or more additional controllers that may process or filter a signal indicative of a wheel steering angle.

The frame sensor 315 is one or more sensors configured to monitor the articulation angle at the axis B between the rear frame section 102 and the front frame section 104 of the motor grader 100. In one exemplary embodiment, the frame sensor 315 is a pivot sensor disposed at the articulation axis B and configured to measure the pivot angle at the articulation axis B. In another exemplary embodiment, the frame sensor 315 is configured to monitor the extension amount of an actuator, such as right and/or left articulation cylinders 138, 140, that may be used to control the amount of articulation between the rear frame section 102 and the front frame section 104 of the motor grader 100. The wheel angle sensor 314 and the frame sensor 315 could be any type of sensor known in the art, including a potentiometer, an extension sensor, a proximity sensor, and an angle sensor, among others. It should be noted that in some exemplary embodiments, the wheel angle sensor 314 and the frame sensor 315 are directly connected to and monitored by the steering compensation module. In other exemplary embodiments, signals representative of the values determined by the wheel angle sensor 314 and the frame sensor 315 are received from another control module on the work machine and may be transmitted over wire or wireless data links.

The steering compensation module 320 may include a processor and a memory device configured to store one or more control routines, which could be software programs, for determining the adjusted speed ratio for each front wheel. The steering compensation module 320 may be associated with the wheel angle sensor 314, the frame sensor 315, and the speed module 312. Based on the wheel steering angle, the frame articulation angle, and/or the desired speed ratio from the speed module 312, the steering compensation module 320 is configured to calculate an adjusted speed ratio for each front wheel so that the wheels provide traction at all times during a turn. The adjusted speed ratio is a ratio calculated to increase or decrease the front wheel speeds to provide traction during the turn. The adjusted speed ratios for the right and left front wheels 142, 144 are referred to herein as a right adjusted speed ratio and a left adjusted speed ratio, respectively.

In one exemplary embodiment, the steering compensation module 320 determines the right and left adjusted speed ratios based on a stored look-up table, such as a mapping function. The mapping function for the right front wheel 142 is different than the mapping function for the left front wheel 144, and may factor in the different turning radius of an inside and outside wheel during a turn. In one exemplary embodiment, the mapping function includes either a linear or a non-linear curve on a two-axis map that may include, for example, a wheel steering angle on one axis and a steering compensation factor on the other axis. The map may use a separate curve for each measurable articulation angle. Then, based on the wheel steering angle and the articulation angle, the steering compensation module 320 uses the map to determine the right and left adjusted speed ratios based on the desired speed ratio received from the speed module 312.

In another exemplary embodiment, the steering compensation module 320 is configured to calculate the right and left adjusted speed ratios using trigonometric equations. In this exemplary embodiment, the steering compensation module 320 determines the adjusted speed ratio necessary to maintain traction during a turn based upon the configuration and/or size of components of the motor grader 100. For example, the adjusted speed ratio for each wheel may be dependent on the distance between the right and left front wheels 142, 144, the distance between the front and rear wheels 118, 110, and/or any number of other parameters.

When a wheel angle sensor 314 is associated with each front wheel, the optional sensor processing 318 may be configured to filter out one sensor signal, while allowing the other to pass to the steering compensation module 304 for processing. Accordingly, in this embodiment, only one signal is considered by the steering compensation module 320 to calculate both the right and left adjusted speed ratios. In one exemplary embodiment, the sensor processing 318 may be configured to filter out the signal from the wheel angle sensor 314 associated with the outside wheel in a turn. Accordingly, in this embodiment, only the signal from the wheel angle sensor 314 associated with the inside wheel is actually considered by the steering compensation module 320. Therefore, the steering compensation module may include two different mapping functions that process the same signal; one that determines the left adjusted speed ratio and one that determines the right adjusted speed ratio.

Optional sensor processing 319 may be associated with the frame sensor 315 and may be configured to filter out one sensor signal, while allowing one or more other signals to pass to the steering compensation module 304 for processing. Accordingly, in the embodiment using the sensor processing 319, only one signal representative of the articulation angle is considered by the steering compensation module 320 to calculate both the right and left adjusted speed ratios. The sensor signals may be associated with frame sensors 315 associated with each of the right and left articulation cylinders 138, 140.

In another exemplary embodiment, the steering compensation module 320 may be configured to calculate the left adjusted speed ratio and the right adjusted speed ratio, based upon signals from the respective wheel angle sensor 314 associated with both of the left and right front wheels. The left adjusted speed ratio and the right adjusted speed ratio may be output from the steering compensation module 320 and provided to the wheel driving system 306.

The wheel driving system 306 is configured to power the front wheels 118 and may include a left hydrostatic transmission (HST) controller 322, a right HST controller 324, a left HST 326, a right HST 328, and left and right speed sensors 316, 317 associated with the left and right front wheels 144, 142. The left and right HST controllers 322, 324 may be configured to receive the respective left and right adjusted speed ratios from the steering compensation module 320 and receive signals indicative of the actual speeds of the left and right front wheels 144, 142 from the respective left and right speed sensors 316, 317. Further, the left and right HST controllers 322, 324 may be configured to process the adjusted speed ratios and measured wheel speeds and output control signals to the left and right HSTs 326, 328, respectively. The left and right HSTs 326, 328 each include a pump and a motor, with the pumps and motors being controlled independently by the HST controllers 322, 324. The motors may each be respectively disposed within a hub of the left and right front wheels 142, 144.

The left and right speed sensors 316, 317 may be associated with the left and right front wheels 144, 142, respectively, and may be configured to measure parameters indicative of the actual wheel speeds or any other rotational speed directly proportional to wheel speed that may be associated with a gear reduction. Signals representative of the wheels speeds may be sent to the left HST controller 322 and a right HST controller 324, respectively. During straight line travel, the speeds of the front wheels 142, 144 will be substantially equal. However, during turning, the speeds of the front wheels 142, 144 vary. The left and right speed sensors 316, 317 are configured to measure the speed of each respective front wheel independent of the speed of the other front wheel. The sensors 316, 317 may be any sensor capable of measuring such information, including a wheel rpm sensor, a wheel speed sensor, or other sensor. In one exemplary embodiment, the actual wheel speed may be measured by measuring the motor speed of the left and right HSTs 326, 328, which is proportional to wheel speed by a front final gear ratio.

Further, because the speed of each front wheel is constantly monitored by the left and right speed sensors 316, 317, the left and right HST controllers 322, 324 may compare the actual speed of each front wheel to the speed desired by the adjusted speed ratio and make corrections for any differences. Thus, if the actual speed varies from the desired speed, the left and right HST controllers 322, 324 may send a signal to speed up or slow down the wheel so that the actual speed corresponds to the speed desired by the adjusted speed ratio. This input from the left and right speed sensors 316, 317 provides a closed loop-system for controlling the front wheel speeds.

In one exemplary embodiment, the control system 300 may be configured to operate using only front-wheel drive, where the rear wheels roll freely. In this embodiment, the operator input device or devices 310 is configured to operate as a continuously variable transmission control, controlling the hydrostatic transmission drive ratio (HST ratio) to the front wheels of the motor grader 100. The speed module 312 may be configured to output the desired HST ratio to the steering compensation module 320, which may determine an adjusted left and right HST ratio so that the right and left front wheels both maintain the same amount of traction and the machine maintains the same ground speed as the rear wheels during a turn. Accordingly, the front wheels may be sped up during a turn to maintain a constant speed at the rear wheels. Alternatively, the front wheels may be controlled during a turn to maintain a constant speed at the front wheels. The steering compensation module may use the mapping functions or trigonometric equations to calculate the adjusted left and right speed ratios based on the wheel steering angle and the frame articulation angle.

INDUSTRIAL APPLICABILITY

An exemplary method for controlling the speed of the front wheels of a motor grader to provide continuous traction in a turn will now be described. During driving, the speed module 312 monitors and receives a transmission speed ratio signal from the transmission 308. In addition, the speed module 312 monitors the gear of the transmission. An operator of the motor grader 100 may select the gear and, in addition, may control the operator input device 310 to control the front wheel speed relative to the rear wheel speed. The speed module 312 calculates a desired speed ratio based upon a signal representative of the aggression factor from operator input device 310, the speed ratio from the transmission 308, and in some exemplary embodiments, the transmission operating gear. The speed module 312 then outputs the desired speed ratio to the steering compensation control 304.

The steering compensation control 304 determines a front wheel speed that provides sufficient traction at all times during a turn using the desired speed ratio from the speed module 312, a signal from the wheel angle sensor 314, and/or a signal from the frame sensor 315. The signal from the wheel angle sensor 314 is representative of the steering angle of the front wheels 118 of the motor grader 100. In one exemplary embodiment, a wheel angle sensor 314 is associated with each front wheel. In another exemplary embodiment, a wheel angle sensor 314 is associated with only one front wheel.

In the exemplary method described, the wheel angle sensor 314 is associated with each front wheel. A sensor processing 318 monitors the signal from each wheel angle sensor 314 and selects which signal to send to the steering compensation module 320. The sensor processing 318 filters unselected signals so that they are not considered by the steering compensation module 320. For example, the sensor processing 318 may allow only the signal of the wheel angle sensor 314 associated with the wheel on the inside of a turn to be received at the steering compensation module 320. In another exemplary, the sensor processing allows signals from wheel angle sensors 314 associated with both the left and right front wheels to be received at the steering compensation module 320 for processing.

The frame sensor 315 monitors the articulation angle between the rear and front frame sections 102, 104 of the motor grader 100. The frame sensor 315 may do this, for example, by monitoring pivoting at the articulation axis B or may monitor the extension amount of actuators, such as articulation cylinders 138, 140. A sensor processing 319 monitors the signal from each frame sensor 315 and selects which signal to send to the steering compensation module 320. The steering compensation module 320 receives the selected signal representative of the articulation angle from the frame sensor 315.

The steering compensation module 320 processes the signals from the wheel angle sensor 314 and the frame sensor 315, along with the desired speed ratio from the speed module 312, to determine left and right adjusted speed ratios for the left and right front wheels 142, 144. The processing may include using a look-up table, such as a mapping function, to determine the left and right adjusted speed ratios. The mapping function may be based upon the articulation angle with each possible articulation angle having a separate map. Using the wheel steering angle, the articulation angle, and/or the desired speed ratio, the steering compensation module 320 determines and outputs right and left adjusted speed ratios representing front wheel speeds necessary to provide traction in a turn. These may also be calculated using trigonometric equations.

Once calculated, the left and right adjusted speed ratios are sent respectively to the left HST controller 322 and the right HST controller 324. The left and right HST controllers 322, 324 convert the adjusted speed ratio signals to control signals to control the respective left and right HSTs 326, 328. The left and right HSTs 326, 328 control the speed of the left and right front wheels independent of one another to provide traction during the turn.

Left and right speed sensors 316, 317 are associated with the left and right front wheels 142, 144 and measure parameters indicative of the actual wheel speeds. The left and right speed sensors 316, 317 independently electronically communicate a signal indicative of the wheel speeds to the left and right HST controllers 322, 324. The left and right HST controllers 322, 324 compare the actual speed of each front wheel 142, 144 to the speed desired by the adjusted speed ratio of each front wheel. If the actual speed varies from the desired speed, the left and right HST controllers 322, 324 compensate the adjusted speed ratios by controlling the left or right HST so that the actual measured speed corresponds to the desired speed of the adjusted speed ratio. Therefore, the system is a closed loop system, and the left and right HST controllers 322, 324 receive signals indicative of the actual speed to ensure the wheel speeds correspond to the desired speed of the adjusted speed ratio for each wheel.

In one exemplary embodiment, the adjusted speed ratio for the inside wheel in a turn is less than the adjusted speed ratio for the outside wheel. This compensates for the difference in turning radius between the two front wheels. Therefore, the inside wheel drives slower than the outside wheel so that both wheels provide a similar amount of traction to properly turn the motor grader. In addition, it should be noted that the steering angles may differ between the left and right front wheels during a turn by angling the inside wheel more than the outside wheel, as known in the art.

The exemplary work machine 100 in FIG. 1 is an articulated motor grader. In some instances, the operator may articulate the work machine 100 at a desired angle, and turn the front wheels 118 to a desired steering angle so that the articulated work machine travels in a straight direction. By considering the articulation angle, the steering compensation module 320 is able to recognize that both the right and left front wheels 142, 144 should be driven at the same speed. However, in another exemplary embodiment, the motor grader is not articulated. In this embodiment, the steering compensation control 304 calculates left and right adjusted speed ratios based only on the desired speed ratio, and the wheel steering angle. This effectively occurs on an articulated work machine when the articulation angle is zero.

Although this disclosure describes providing traction during a turn on a motor grader, the disclosed system may be used on any articulated truck, tractor-scraper, and compactor, for example, that relies upon separately powered front wheels. In addition, it may be used on any wheeled non-articulated truck, including an off-highway truck, a wheel loader, and others using separately powered front wheels. Thus, various work machines having a need for front wheel traction in a turn can be benefited.

It will be apparent to those skilled in the art that various modifications and variations can be made in the disclosed embodiments without departing from the scope of the invention. Other embodiments of the invention will be apparent to those skilled in the art from consideration of the specification and practice of the invention disclosed herein. It is intended that the specification and examples be considered as exemplary only, with a true scope of the invention being indicated by the following claims and their equivalents.

What is claimed is:

1. A method of controlling the speed of a wheel of a machine, comprising:
   receiving a speed command based at least partially on an operator input;
   monitoring an articulation angle between a front frame section and a rear frame section of the machine, the front frame section including a right front wheel, a left front wheel and a front wheel power system having a right hydrostatic transmission for powering the right front wheel and a left hydrostatic transmission for powering the left front wheel, and the rear frame section having a right rear wheel, a left rear wheel and a rear wheel power system separate from the front wheel power system, for powering the right rear wheel and the left rear wheel;
   monitoring a wheel steering angle of the right front wheel or the left front wheel;
   determining a wheel speed command based at least partially on the wheel steering angle; and
   outputting the wheel speed command to control the speed of the right front wheel or the left front wheel.

2. The method of claim 1, including:
   receiving the wheel speed command at a first hydrostatic transmission controller for controlling a hydrostatic transmission to drive the wheel.

3. The method of claim 1, including:
   sensing a speed of the wheel, and
   determining the wheel speed command includes consideration of the sensed speed of the wheel.

4. The method of claim 1, wherein the wheel speed command is based upon the monitored articulation angle.

5. The method of claim 1, wherein determining the wheel speed command is accomplished using a mapping function based on the received speed command and the wheel steering angle.

6. The method of claim 1, wherein determining the wheel speed command is accomplished using trigonometry based on a machine configuration and the wheel steering angle.

7. The method of claim 1, wherein monitoring the wheel steering angle includes monitoring the wheel steering angle of the wheel that is inside during a turn.

8. The method of claim 1, further including:
   determining the aggression factor based on desired speeds of at least one front wheel and at least one rear wheel:
   generating a desired speed ratio by multiplying the aggression factor with a rear transmission speed ratio; and
   generating an adjusted speed ratio, based on the desired speed ratio and the articulation angle.

9. A system for controlling the speed of at least one of a right front wheel and a left front wheel on a machine, comprising:
   a front frame including a right front wheel, a left front wheel and a front wheel power system having a right hydrostatic transmission for powering the right front wheel and a left hydrostatic transmission for powering the left front wheel;
   a rear frame including a right rear wheel, a left rear wheel and a rear wheel power system separate from the front wheel power system, for powering the right rear wheel and the left rear wheel;
   an operator input device;
   a speed module configured to generate a speed command based at least partially on a signal from the input device;
   at least one wheel angle sensor associated with at least one of the right and the left front wheels, the at least one wheel angle sensor being configured to monitor at least one wheel steering angle of the at least one of the right and left front wheels; and
   a steering compensation module configured to determine a wheel speed command based at least partially on the at least one wheel steering angle, the steering compensation module being configured to output the wheel speed command to control the speed of at least one of the right and the left front wheels.

10. The system of claim 9, including
   a hydrostatic transmission controller associated with at least one of the right wheel and the left wheel and configured to drive at least one of the right wheel and the left wheel; and
   wherein the hydrostatic transmission controller is configured to receive the wheel speed command to drive at least one of the right and left wheels.

11. The system of claim 9, including:
   a speed sensor associated with at least one of the right wheel and the left wheel, and configured to sense a speed of the wheel; and
   wherein the steering compensation module is configured to determine the wheel speed command based at least partially on the sensed speed of the at least one of the right and left wheels.

12. The system of claim 9, including at least one frame sensor configured to monitor an articulation angle between the front frame section and the rear frame section of the machine, the at least one frame sensor being in communication with the steering compensation module,
   wherein the steering compensation module is configured to determine the wheel speed command based at least partially on the articulation angle and the steering angle.

13. The system of claim 9, wherein the steering compensation module is configured to use a mapping function to determine the wheel speed command based at least partially on the received speed command and the steering angle.

14. The system of claim 9, wherein the steering compensation module is configured to use trigonometric equations to determine the wheel speed command based at least partially on a machine configuration and the wheel steering angle.

15. The system of claim 9, wherein the steering compensation module is configured to determine the wheel speed command based on the wheel steering angle of the left or right wheel that is on the inside of a turn.

16. The system of claim 9, including a sensor processing configured to monitor signals from the at least one wheel angle sensor and filter signals associated with the wheel steering angle of the wheel that is on the outside of a turn.

17. A method of controlling the speed of at least one of a right front wheel and a left front wheel on an all-wheel drive, articulating motor grader, comprising:
receiving a speed command based at least partially on an operator input and a desired speed of front wheels of the motor grader relative to rear wheels of the motor grader;
monitoring a wheel steering angle of at least one front wheel;
monitoring an articulation angle between a front frame section and a rear frame section of the motor grader; and
determining a wheel speed command based at least partially on the speed command, the wheel steering angle and the articulation angle; and
outputting the wheel speed command to control the speed of at least one of the right front wheel and the left front wheel.

18. The method of claim 17, including:
receiving the wheel speed command at a hydrostatic transmission controller for controlling a hydrostatic transmission to drive at least one of the right front wheel and the left front wheel.

19. The method of claim 17, including:
sensing a speed of at least one of the right front wheel and the left front wheel with a wheel speed sensor; and
determining the wheel speed command includes consideration of the sensed speed of at least one of the right and left front wheels.

20. The method of claim 17, wherein determining the wheel speed command is accomplished using one of
a mapping function based on the received speed command, the articulation angle, and the wheel steering angle; and
trigonometry based on distance between front wheels of the motor grader, the distance between front and rear wheels of the motor grader, and the wheel steering angle.

* * * * *